Figure 1:
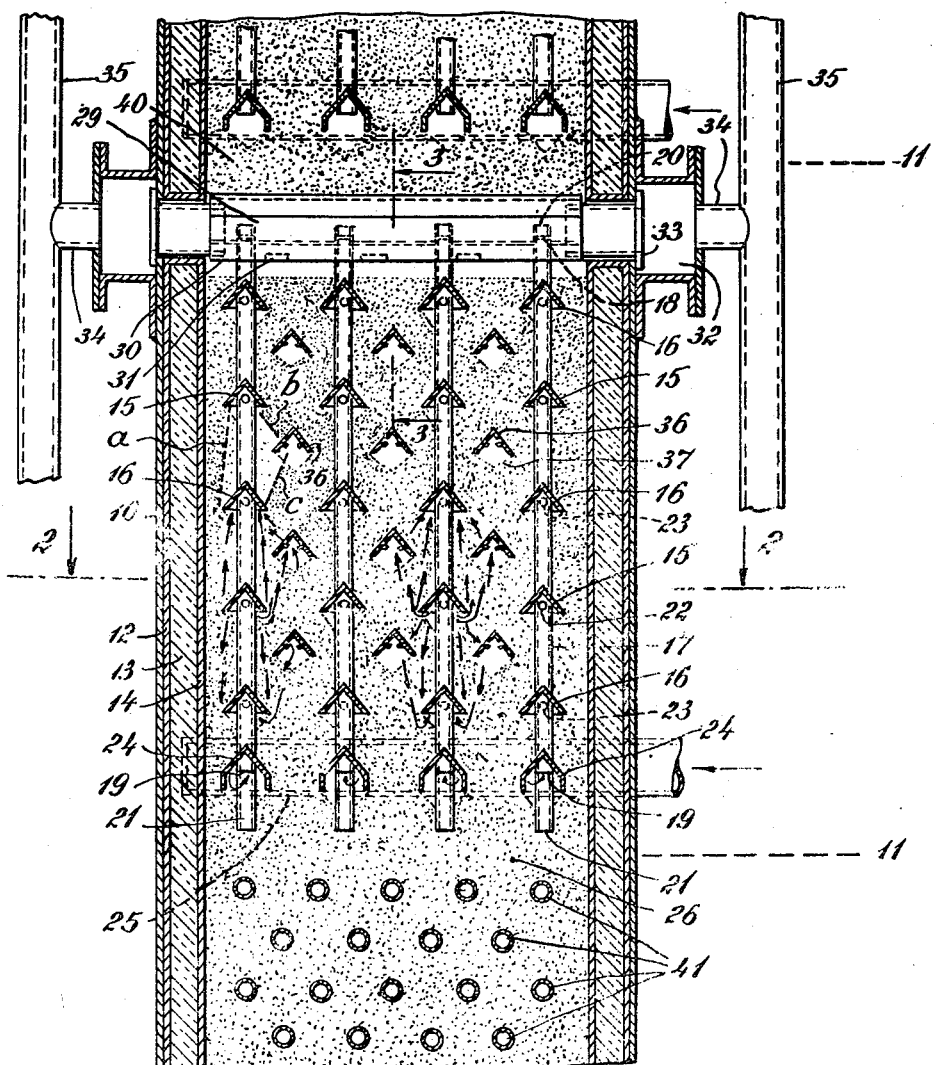

Jan. 4, 1949.  J. W. PAYNE  2,458,412
APPARATUS FOR CONTACTING GASES
WITH A SOLID MATERIAL
Original Filed May 20, 1944  2 Sheets-Sheet 1

Fig. 1,

John W. Payne
INVENTOR

BY John A. Crowley
AGENT OR ATTORNEY

Jan. 4, 1949.  J. W. PAYNE  2,458,412
APPARATUS FOR CONTACTING GASES
WITH A SOLID MATERIAL
Original Filed May 20, 1944  2 Sheets-Sheet 2

JOHN W. PAYNE
INVENTOR

BY John A. Crowley Jr.
AGENT OR ATTORNEY

Patented Jan. 4, 1949

2,458,412

UNITED STATES PATENT OFFICE 2,458,412

APPARATUS FOR CONTACTING GASES WITH A SOLID MATERIAL

John W. Payne, Woodbury, N. J., assignor to Socony-Vacuum Oil Company, Incorporated, a corporation of New York Original application May 20, 1944, Serial No. 536,494. Divided and this application January 10, 1946, Serial No. 640,363

7 Claims. (Cl. 23—288)

This application is a division of application, Serial Number 535,494, filed in the United States Patent Office on May 20, 1944.

This invention has to do with an apparatus for carrying out reactions involving a contact mass of granular or particle form and vaporous reactants. It is particularly concerned with apparatus of this general nature wherein the contact mass flows either continuously or semi-continuously through the reaction zone. This apparatus is applicable to any conversion of this general type and is specifically applicable to such operations as the vapor phase conversion of high boiling point petroleum hydrocarbons to lower boiling point hydrocarbons, to vapor phase oxidation of organic compounds, to polymerization of vaporous compositions and in general to any reaction which may be carried out by contacting of a reactant material in vapor phase with a catalytic material which may take the form of a contact mass material or which may be deposited within or upon such a contact mass material. Since many such reactions require regeneration of the contact mass used and since such regeneration usually likewise takes the form of a contact of gaseous or vaporous reactant with a contact mass, the apparatus and method is also capable of being utilized for such regenerations. As a specific example of a conversion which may be accomplished, there may be cited the above mentioned conversion of high boiling point petroleum fractions to gasoline. Such conversions are usually carried out in the presence of an adsorbent refractory contact mass consisting of associated alumina and silica in granular or pellet form. Such contact masses are frequently referred to as clays. As a specific example of regeneration reactions, there may be mentioned the regeneration of the above contact mass by reacting it with air or oxygen containing gas to remove from it combustible carbonaceous deposits laid down during the conversion.

Proper utilization of contact masses in such processes requires a rather complete diffusion of vaporous reactants into the contact mass. It also requires the capability of passing comparatively large volumes of gaseous reactants through the apparatus without undue pressure drop. In former designs, it usually has been found necessary to sacrifice one of these desirable features to some extent in favor of the other. For example, in a process wherein the reactants are passed through a relatively deep bed of contact mass, limited spaced velocities of reactant were necessary both to avoid undue pressure drop and to avoid space velocities at which the carrying effect of a reactant would be such as to bring about "boiling" of the contact mass with consequent channeling and ineffective utilization. When some form of structure was utilized which presented a sufficient amount of voids distributed throughout the contact mass to avoid undue pressure drops it became difficult to secure good diffusion of reactants into the contact mass.

An apparatus wherein gaseous reactants are contacted with a moving solid column of contact mass material in such a manner as to provide diffusion of such reactants through such contact mass material while at the same time permitting relatively high rates of gas flow throughout coupled with relatively low overall pressure drops is the subject of the application for U. S. Patent Serial No. 447,432, filed June 17, 1942, now Patent No. 2,417,399, dated March 11, 1947, of which the present applicant was one of the applicants. In a preferred form of the apparatus disclosed in that application, gas was introduced to the column of moving solid material through a plurality of vertically spaced inlet distributors extending transversely across the column of solid material and arranged in horizontally spaced vertical rows; and the gas was withdrawn from the column through a plurality of vertically spaced collectors arranged in vertical rows intermediate said rows of distributors.

The instant invention is an improvement over the apparatus above described and is especially directed to an apparatus having the advantages of the one above referred to while providing an improvement in the uniformity of solid material contact with the gas throughput in all sections of a reaction zone. In systems wherein a particle form solid material passes downwardly through a reaction zone as a substantially compact column, it is very difficult to prevent at least some of the solid material particles from passing downwardly in substantially the same vertical plane during the entire length of its travel through a reaction zone. In such systems it is important not only to provide uniform rates of gas flow in all parts of the column cross-section, but it is also necessary to provide uniform contact of the solid material in all parts of the column cross-section with gas of the same average composition. Otherwise part of the solid material will be overtreated or overexposed and part will be undertreated or underexposed resulting not only in inefficient use of the solid material but also lack of uniformity in the treatment of the gas throughput.

The improved apparatus disclosed herein provides a novel solution to this difficulty while at the same time providing all of the advantages of the above mentioned apparatus which is the subject of U. S. patent application Serial No. 447,-432. As a result, improved treating efficiencies may be obtained and relatively wide spacing of the gas distributor and collector members is permissible in those operations wherein such spacing is desirable.

A major object of this invention is the provision of an apparatus wherein gaseous materials may be passed through a moving column of particle form solid material for the purpose of treatment in such a manner as to insure uniform gas flow across substantially the entire column cross-section and uniform contact of substantially all the solid material with both fresh and partially spent gas, while at the same time permitting relatively high rates of gas flow throughout, coupled with a relatively low pressure drop.

Figure 2:
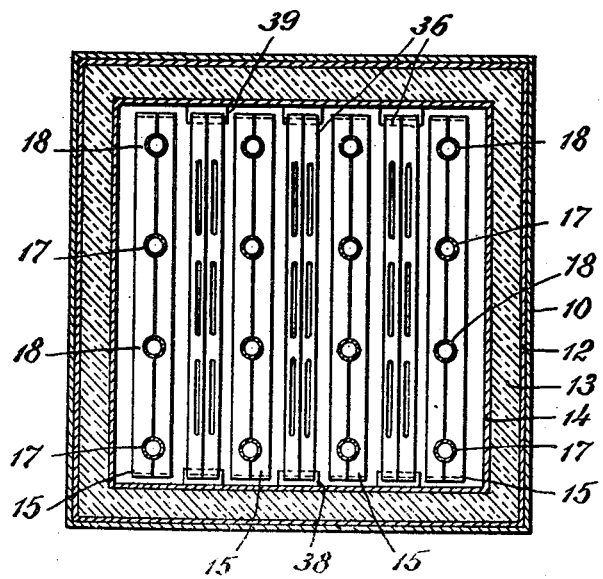
Figure 3:
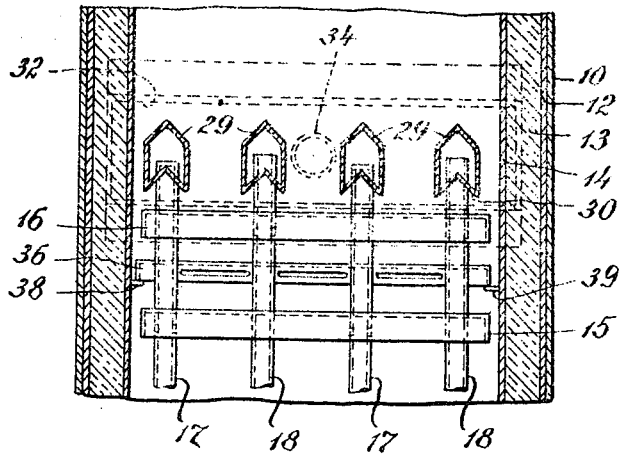

This object and other objects, as will be pointed out hereinafter, have been obtained by the development of an apparatus which may be more readily understood by referring to the several drawings attached to this specification, in which drawings Figure 1 is an elevational view, partially in section, of the apparatus; Figure 2 is a sectional plan view taken at line 2—2 in Figure 1 and Figure 3 is a sectional view taken along line 3—3 of Figure 1. All of these drawings are highly diagrammatic in form.

Turning now to Figure 1, this figure represents in diagram form a vertical section of an apparatus according to this invention for contacting gasi-form reactants with a substantially compact column of downwardly flowing granular or particle form solid material. In this drawing, 10 represents the shell of a reactor and the portion between lines 11 represents one reaction section thereof. A reactor depending upon conditions and capacities to be met may consist of one or more sections similar to that between lines 11; only one such section will be explained in detail. The reactor is lined internally with a thickness of insulation 13 supported between two casing plates 12 and 14. Positioned within the reactor are a plurality of inverted angle shaped troughs such as 15 and 16 which extend transversely across the reactor in a direction perpendicular to the plane of the drawing. These troughs are arranged in a plurality of vertical rows spaced side by side across the reactor, the troughs being vertically spaced apart in said vertical rows. A plurality of vertical tubes are spaced horizontally apart in a direction perpendicular to the plane of the drawing along each row of troughs so that the tubes pass through each trough of each vertical row of troughs. These tubes are of two types, distributing tubes and collecting tubes, arranged alternately in each row. The front row shown in Figure 1 as tubes 17 are distributor tubes which are closed at their upper ends 18 and are open at their lower ends 19. The collector tubes are open on either end and are a little longer than the distributing tubes so that the upper ends 20 and lower ends 21 of these tubes may be seen projecting beyond the ends of the distributing tubes. Perforations or orifices 22 are provided in the distributor tubes at locations under the vertically alternate troughs 15 which serve as distributing troughs, so as to place the interior of said tubes in communication with the space under said troughs. Perforations or orifices are not provided in the distributor tubes at locations under the remaining vertically alternate troughs 16, which are gas collector troughs. Perforations or orifices are provided in the collector tubes under the collector troughs 16 and not under the distributor troughs 15. These latter orifices are represented by the dotted circles 23. Near the bottom of the reaction section a row of horizontally spaced gas inlet hoods 24 are provided, which have angle shaped roofs through which the distributor and collector tubes extend. These gas inlet hoods are open on their inlet ends into a gas inlet duct running behind the reactor shell in a position indicated by dotted lines 25. It will be seen that the gas collector tubes extend through these gas inlet hoods and extend down into the column of particle form solid material in the seal zone 26, below the reaction section, so that the flow of inlet gas into the lower ends of the collector tubes is substantially prevented. Near the top of the reaction section are positioned a row of gas outlet hoods 29 which are shown running horizontally across the reaction section in a direction perpendicular to that of the inlet hoods. These outlet hoods have an inverted angle shaped roof and an upright angle shaped bottom in which slots 31 are provided for escape of entrained solid material. Each of these hoods are open on either end and placed in communication with gas outlet manifold box 32 by means of hollow sleeves 33. Both the distributor and collector tubes extend through the bottom 30 of these hoods and are supported and/or braced thereby. Outlet conduits 34 are provided between the outlet manifold boxes 32 and the gas outlet ducts or stacks 35.

Also positioned within the reaction section are a plurality of deflectors 36, which extend transversely across the section in a direction perpendicular to the plane of the drawings and which are arranged horizontally intermediate the rows of distributor and collector troughs and tubes and vertically intermediate adjacent distributor and collector troughs. These deflectors are in the form of inverted louvered angles, the louvers in the sides of said angles being such as will permit free flow of gas therethrough while substantially preventing flow of particle form solid material therethrough. One or more rows of such louvers may be provided in each side of the deflecting angle. Moreover, in a less preferred modification deflector troughs having perforated sides may be used provided the perforations are such as will prevent passage of the solid particles therethrough. These deflectors thus define substantially solid material free bypass passages for gas flow through portions of the moving solid material column maintained in the reactor during operation. The amount of solid by-pass is substantially equal to the vertical distance between the surface of the solid material, represented by dotted lines 37, under such deflector to the louvered openings in the sides of such deflectors. In the preferred modification of this invention, the size and spacing of such deflectors should be such that the distance for vertical gas flow through the solid material between vertically adjacent distributor and collector troughs, represented by dotted line $a$, should be substantially equal to the sum of the straight line distances for gas flow through the solid material from inlet trough 15 to deflector 36, line $b$, plus that from deflector 36 to collector trough 16, line $c$. Under such conditions the gas may flow through the solid material between the distributor and collector troughs with equal ease by either of the two passages, thereby providing uniform gas flow across the entire reactor cross-section.

Turning now to Figure 2, which is a sectional plan view of the reaction section taken at line 2—2 in Figure 1, we find the reactor shell 10, the insulation 13, the distributor troughs 15, the distributor tubes 17 and collector tubes 18 and the deflectors 36. It will be seen that the deflectors 36 are supported on their ends from casing 14 by supports 38 and 39. It will be seen that distributor and collector tubes are arranged alternately in each row thereof. While this is a preferred arrangement, other arrangements may be used. For example, the distributor and collector tubes in each row might be arranged in alternate sets of two.

Turning to Figure 3, which is a sectional view taken at lines 3—3 in Figure 1, we find the shell 10, insulation 13, gas outlet hoods 29 having angled shaped bottoms 30, the distributor tubes 17, the collector tubes 18, the distributor trough 15 and collector trough 16 and the deflector 36. Behind the reactor is shown the gas outlet manifold box 32 and outlet conduit therefrom 34. It will be seen that the upper ends of the gas collector tubes are open while those of the distributor tubes are closed.

Turning again to Figure 1 for study of the operation of the apparatus, particle form solid material is passed through the reaction section as a substantially compact column of downwardly moving material, sufficient space being provided at either end of the section to provide columns of said material of sufficient length to substantially prevent the flow of gas from the ends of the reaction sections into adjacent sections. Such sections may be called seal zones and are represented at 26 and 40. The rate of flow of the solid material may be suitably controlled by throttling means provided at the bottom outlet from the reaction vessel (not shown). Gaseous reactants enter the inlet hoods 24 from inlet duct 25 and then pass into the distributor tubes 17 through the lower ends thereof. The gas is then distributed by these tubes through orifices 22 under all of the gas distributor troughs 15. The gas then flows through the solid material between distributor troughs in the paths clearly shown by arrowed lines, the flow being both upward and downward between adjacent distributor and collector troughs and part of the flow taking paths through the by-pass passages provided by deflectors 36. The gas is withdrawn from under the collector troughs 16 through orifices 23 into collector tubes 18 through which it flows upwardly, discharging under outlet hoods 29. It is then withdrawn through sleeves 33 into manifold boxes 32 and thence through conduits 34 and ducts 35 to the product recovery system of the process or to a stack depending upon the type of process involved. The distributor and collector troughs and the deflectors 36 act to deflect the flow of the solid material so as to substantially limit the percentage of solid material passing straight through the reaction section in any one vertical plane. Moreover, by the arrangement for gas flow herein provided solid material passing along a vertical plane near the distributor and collector troughs is alternately contacted with fresh and spent reactant gas, and solid material passing along a vertical plane near the deflectors 36 is constantly subjected to a gas which is only partly spent. Consequently, any solid material passing downward through the reaction section along any plane in the reaction zone would be on the average equally exposed to reactant gas of approximately the same average degree of freshness. Not only is this accomplished, but also by provision of paths of flow for gas through the solid material at locations horizontally between vertical rows of distributor and collector troughs, which paths of flow offer no more resistance to gas flow than the direct vertical paths between adjacent distributor and collector troughs, a uniform rate of gas flow is provided throughout the entire reactor cross-section. This permits increased reaction efficiencies especially in those processes wherein the gases are being catalytically converted into valuable gaseous products, such as, for example, the catalytic cracking conversion of hydrocarbon gas oils to gasoline. Inasmuch as the maximum distance for gas flow through the solid material in the reaction zone is only the depth of the bed between gas distributor and adjacent gas collector troughs, very considerable volumes of reactants with respect to the volume of solid material may be handled at relatively low pressure drops.

In some operations, such as for example, the regeneration of contaminant bearing particle form solid adsorbent materials by the action of a combustion supporting gas, it may be desirable to remove or add heat to the solid material. In such operations it is desirable to pass the solid material through a series of superposed regeneration sections or stages such as hereinabove described, each stage being separated by seal zones as 40 and 26 in Figure 1 to prevent interflow of gas between adjacent stages. The seal zones may be made of sufficient length between at least some of the stages to permit provision of heat exchange tubes therein. Such tubes 41 are shown in the seal zone 26 of Figure 1. A fluid heat transfer medium may be passed through such tubes in such a way as to provide addition or removal of heat to or from the solid material passing through such zones. It is obvious that if Figure 1 were directed only to a single section reactor in which control of solid material temperature was desired prior to entry to the reaction section, that tubes such as 41 could be mounted similarly upwardly of the gas outlet hoods 29.

While the hereinabove described apparatus is a preferred form of this invention, it will be apparent that modified shapes and types of gas distributing members and gas collecting members, and by-pass passage defining deflectors may also be employed within the scope of this invention. Moreover, modified means for distributing the gas to said distributing troughs and collecting gas from said collecting troughs may also be employed. As has been hereinbefore shown, in the preferred embodiment of the invention, it is desirable that the positioning and size of the deflectors 36 of Figure 1, be such that the distance for gas flow through solid material in a substantially vertical path between adjacent gas distributor and collector troughs is substantially equal to the distance for gas flow through the solid material between the same distributor and collector troughs by way of the deflector adjacent thereto. It will be understood, however, that a somewhat less desirable, though still entirely feasible operation may be obtained when the distance for gas flow over the two paths is somewhat different.

It will be understood that the attached drawings and the description of the apparatus of this invention are merely exemplary in nature and are in no way intended to limit the scope of this

I claim:

1. In an apparatus for contacting gas with particle form solid material, means defining a vertical chamber, a plurality of gas inlet and gas outlet deflectors arranged in a plurality of substantially vertical rows of vertically spaced alternate inlet and outlet deflectors, said vertical rows being spaced side by side across said chamber, each of said deflectors comprising an inverted trough, a plurality of vertical tubes, spaced horizontally apart, passing through each deflector of each vertical row of deflectors so as to form a plurality of rows of said vertical tubes spaced side by side across said vessel, certain of said tubes being perforated to provide communication between the interior thereof and the space below each gas inlet deflector through which they pass, said tubes serving as distributor tubes, the remainder of said tubes being perforated to provide communication between the interior thereof and the space below each gas outlet deflector, said tubes serving as collector tubes, duct means to admit gas to each of said distributor tubes and duct means to withdraw gas from each of said collector tubes, a second plurality of deflectors comprising inverted troughs positioned within said chamber at locations horizontally intermediate said vertical rows of inlet and outlet deflectors and vertically intermediate adjacent inlet and outlet deflectors, said last named inverted troughs having foraminate sides of such construction as to permit flow of gas therethrough while substantially preventing passage of solid particles therethrough.

2. In an apparatus for contacting gas with particle form solid material, means defining a substantially vertical chamber, a plurality of inverted gas inlet and gas outlet troughs arranged in a plurality of substantially vertical rows of vertically spaced alternate inlet and outlet troughs, said rows being spaced apart side by side across said chamber, means to admit gas to the underside of said gas inlet troughs, means to withdraw gas from the underside of said gas outlet troughs, a plurality of horizontally extending trough forming members forming troughs having foraminate sides positioned within said chamber horizontally intermediate said vertical rows of inlet and outlet troughs and vertically intermediate adjacent inlet and outlet troughs.

3. An apparatus for contacting gas with moving particle form solid material comprising means defining a substantially vertical elongated chamber, means to supply solid material to the upper end thereof, means to withdraw solid material from the lower end thereof, a plurality of vertically spaced apart groups of horizontally extending inverted gas inlet and outlet troughs in said chamber, the troughs in each group being arranged in a plurality of substantially vertical rows of vertically spaced alternate inlet and outlet troughs, said rows of troughs being spaced apart side by side across said chamber, means to admit gas to the underside of said gas inlet troughs in each group, means to withdraw gas from the underside of said gas outlet troughs in each group, and a plurality of horizontally extending inverted troughs positioned within said chamber horizontally intermediate said vertical rows of inlet and outlet troughs and vertically intermediate adjacent inlet and outlet troughs, said second plurality of troughs having louvered sides of such construction as to permit gas flow therethrough while substantially preventing gravity flow of solid particles therethrough.

4. A catalyst regenerator comprising means defining a substantially vertical chamber, means to supply solid material to the upper end thereof, means to withdraw solid material from the lower end thereof, a plurality of vertically spaced apart groups of horizontally extending inverted gas inlet and outlet troughs in said chamber, the troughs in each group being arranged in a plurality of substantially vertical rows of vertically spaced alternate inlet and outlet troughs, said rows of troughs being spaced apart side by side across said chamber, means to admit gas to the underside of said gas inlet troughs in each group, means to withdraw gas from the underside of said gas outlet troughs in each group, a plurality of horizontally extending inverted troughs positioned within said chamber horizontally intermediate said vertical rows of inlet and outlet troughs and vertically intermediate adjacent inlet and outlet troughs, said second plurality of troughs having foraminate sides of such construction as to permit flow of gas therethrough while substantially preventing passage of solid particles there through, a plurality of heat exchange tubes distributed across said vessel at at least some of the levels therein between said groups of troughs and means to pass a heat exchange fluid through said tubes.

5. In an apparatus for contacting gas with particle form solid material, means defining a substantially vertical chamber, suitable for confining a substantially compact column of particle form solid material, a plurality of inverted horizontally extending gas inlet and gas outlet troughs arranged in a plurality of substantially vertical rows of vertically spaced alternate gas inlet and gas outlet troughs, said rows being spaced apart side by side across said chamber, corresponding gas inlet troughs in all the rows being disposed at substantially the same vertical levels and corresponding gas outlet troughs in all the rows being disposed at substantially the same vertical levels, means to admit gas to the underside of said gas inlet troughs, means to withdraw gas from the underside of said gas outlet troughs, a second plurality of horizontally extending inverted troughs positioned within said chamber horizontally intermediate said vertical rows of inlet and outlet troughs and vertically intermediate adjacent inlet and outlet troughs, said second plurality of troughs having louvered sides of such construction as to permit gas flow therethrough while substantially preventing solid particle flow therethrough.

6. An apparatus according to claim 5 characterized in that the size and positioning of said inverted louvered troughs is such that the vertical distance for gas flow through particle form solid material between adjacent gas inlet and gas outlet troughs in any given vertical row thereof is substantially equal to the distance for gas flow through particle form solid material between the same two inlet and outlet troughs by way of the corresponding intermediately placed louvered trough.

7. An apparatus for contacting a particle form solid material with a gas comprising: means defining a substantially vertical chamber suitable for confining a substantially compact column of particle form solid material, a plurality of horizontally extending gas inlet and gas outlet deflectors arranged in a plurality of substantially vertical rows of vertically spaced alternate inlet and outlet deflectors, said vertical rows being spaced apart side by side across said chamber, each of said deflectors comprising means defining an inverted trough and corresponding inlet and outlet deflectors in all the vertical rows being positioned at substantially the same levels, a plurality of vertical tubes spaced horizontally apart, passing through each deflector of each vertical row of deflectors so as to form a plurality of rows of said vertical tubes spaced side by side across said vessel, certain alternate tubes in each row being closed at one of their ends and being perforated to provide communication between the interior thereof and the space below each gas inlet deflector through which they pass, said tubes serving gas distributor tubes, the remaining alternate tubes in each row being perforated to provide communication between the interior thereof and the space below each gas outlet deflector through which they pass, said tubes serving as gas collector tubes, duct means to admit gas to the open end of each of said distributor tubes and means to prevent gas flow into the corresponding end of the collector tubes, duct means to withdraw gas from each of said collector tubes at their ends corresponding to the closed ends of said distributor tubes, a plurality of inverted troughs positioned within said chamber at locations horizontally intermediate said vertical rows of inlet and outlet deflectors and vertically intermediate adjacent inlet and outlet deflectors, said inverted troughs having foraminate sides of such construction as to permit flow of gas therethrough while substantially preventing passage of solid particles therethrough.

JOHN W. PAYNE.

REFERENCES CITED

The following references are of record in the file of this patent:

UNITED STATES PATENTS

| Number | Name | Date |
|---|---|---|
| 1,346,335 | Randolph | July 13, 1920 |
| 1,685,338 | Randolph | Sept. 25, 1928 |
| 2,417,399 | Simpson et al. | Mar. 11, 1947 |